United States Patent [19]

Tsai

[11] 4,153,765

[45] May 8, 1979

[54] CURABLE COMPOSITION CONTAINING EPM OR EPDM INTERPOLYMERS

[75] Inventor: Thomas C. H. Tsai, Baton Rouge, La.

[73] Assignee: Copolymer Rubber & Chemical Corporation, Baton Rouge, La.

[21] Appl. No.: 890,125

[22] Filed: Mar. 27, 1978

Related U.S. Application Data

[63] Continuation of Ser. No. 681,433, Apr. 29, 1976, abandoned.

[51] Int. Cl.² .............................................. C08F 8/42
[52] U.S. Cl. ..................................... 526/48.1; 526/50; 526/54; 526/279
[58] Field of Search ......................................... 526/48.1

[56] References Cited

U.S. PATENT DOCUMENTS

| | | | |
|---|---|---|---|
| 3,240,768 | 3/1966 | Guenther | 526/159 |
| 3,644,306 | 2/1972 | Longi et al. | 526/48 |
| 4,022,961 | 5/1977 | Bond et al. | 526/279 |

*Primary Examiner*—William F. Hamrock
*Attorney, Agent, or Firm*—McDougall, Hersh & Scott

[57] ABSTRACT

Room temperature curable composition containing EPM or EPDM interpolymers having bound ethylene organosilane monomers in which residual hydrolyzable groups of the bound organosilicon components are in the form of lower alkoxy groups, an organotin carboxylate for controlling cure, and which may include an organic amine, an aminosilane, organic hydroxyl compounds and fillers, and in which the EPM or EPDM is of lower molecular weight fluid consistency.

19 Claims, No Drawings

CURABLE COMPOSITION CONTAINING EPM OR EPDM INTERPOLYMERS

This is a continuation of application Ser. No. 681,433, filed Apr. 29, 1976, now abandoned.

This invention relates to curable compositions containing interpolymers of ethylene, monoolefin containing 3 to 16 carbon atoms, and unsaturated organo silane monomers, with or without a polyene. This invention represents an improvement over the invention described in the copending application of Bond and Wahlbort, Ser. No. 610,988, filed Sept. 8, 1975, the disclosure of which is incorporated herein by reference.

The interpolymers of this invention are prepared by the interpolymerization of a first monomeric component in the form of ethylene, and a second monomeric component in the form of an unsaturated organo silane having the general formula $R_nSiX_{4-n}$ in which X is a highly hydrolyzable group other than an oxygen containing group, as represented by a halogen such as chlorine, bromine or iodine, a tertiary amino group, and the like, R is a group selected from the group consisting of hydrogen, an organic aliphatic group such as methyl, ethyl, vinyl, allyl, propyl, isopropyl, butyl, amyl, hexyl, octadecyl, and the like $C_1$-$C_{18}$ hydrocarbons, an organic alicyclic group such as cyclopentyl, cyclohexyl and the like, an aryl or alkaryl group such as phenyl, mono- and polyalkyl phenyls such as tolyl, xylyl, mesitylyl, mono-, di- and triethyl phenyls, naphthyl, mono- and polyalkyl naphthyls such as methyl naphthyl, diethyl naphthyl, etc., and anthracyl, and aralkyl group such as benzyl, 2-phenylethyl, and the like, a heterocyclic radical, and in which at least one of the R groups is an organic group having at least one carbon-to-carbon double bond, such as allyl, vinyl and the like, and in which the unsaturated organic group is preferably a norbornenyl or alkyl substituted norbornenyl group, and in which said groups may be substituted or unsubstituted, halogen substituted or unsubstituted, and in which n is a number of from 1 to 3, and a third monomeric component in the form of monoolefins, preferably an -monoolefin containing from 3 to 20 carbon atoms, and preferably 3 to 10 carbon atoms, as represented by the preferred component propylene. If desired a fourth monomeric component in the form of a polyene may also be included.

The silicon containing compounds as mentioned above are usually called unsaturated organosilanes but they can also be called silyl substituted olefins depending on the complexity of the organic substituents on the silicon atom. It will be noted later that the nomenclature has followed the organosilane precedent when discussing simple silicon substituted olefins but when specific norbornene compounds were mentioned the silyl-organic type nomenclature has been used.

It will be understood that the second monomer may comprise one or a mixture of unsaturated organosilanes of the type described and that the third monomeric component may be formed of one or more olefins having from 3 to 20 carbon atoms and that the fourth monomer in the form of a polyene may constitute one or a number of polyenes of the types which will hereinafter be described in greater detail.

The second monomer or group of monomeric compounds, identified as an unsaturated organosilane, may be represented by the general formula $R_nSiX_{4-n}$ in which n is a number from 1 to 3, X is a highly hydrolyzable group such as a halogen group, a tertiary amino group and the like, and R is hydrogen or an organic group as previously described, in which at least one of the R groups is an organic group containing one or more olefinic groups, in which the second monomer may be represented by such compounds as vinyltrichlorosilane, allyltrichlorosilane, vinyldichlorosilane, allylmethyldichlorosilane, allyldimethylchlorosilane and the like; an unsaturated aryl or alkaryl silane such as styryltrichlorosilane and the like, but it is preferred to make use of a silane in which an unsaturated organo group on the silicon atom is a norbornenyl group as represented by 5-trichlorosilyl-2-norbornene, 5-methyldichlorosilyl-2-norbornene, 5-dimethylchlorosilyl-2-norbornene, 6-methyl-5-trichlorosilyl-2-norbornene, 7-methyl-5-trichlorosilyl-2-norbornene, 5-trichlorosilylmethyl-2-norbornene, 5-phenyldichlorosilyl-2-norbornene, 5-tribromosilyl-2-norbornene, 6-chloro-5-trichlorosilyl-2-norbornene, 5,6-bis(trichlorosilyl)-2-norbornene, and 7-isopropylidenyl-5-trichlorosilyl-2-norbornene.

The interpolymer is preferably formed with a third monomeric component in the form of an α-olefin having from 3 to 20 carbon atoms and may be represented by the general formula $R-CH=CH_2$, wherein R is a $C_1$ to $C_{18}$ alkyl radical which may be branched or straight chained, halogen substituted or unsubstituted, and which may be represented by the compounds propylene, 1-butene, 1-pentene, 1-hexene, 1-heptene, 1-octene, 1-nonene, 1-decene, 4-methyl-1-pentene, 4-methyl-1-hexene, 4,4-dimethyl-1-pentene, 5-methyl-1-heptene, 6-methyl-1-heptene, etc. The third monomeric component may also be a mono unsaturated bridged ring hydrocarbon or halogenated bridged ring hydrocarbon such as the derivatives of bicyclo (2,2,1)heptene. Specific examples of preferred bridged ring compounds of this type are norbornene, 5-chloro-2-norbornene, 7,7-dimethyl-2-norbornene, 5-ethyl-2-norbornene and the like.

A fourth monomeric component, in the form of a polyene, may be copolymerized with the first, second and third monomers, but the cure or vulcanization characteristics usually derived from the inclusion of a polyunsaturated monomer in the form of a polyene, is not essential since cure or vulcanization of the interpolymer, compounded into the composition of this invention, can be effected and is preferably derived through the hydrolyzable groups of the organosilicon component, under the conditions that will hereinafter be described. As a result, a fourth monomer in the form of a polyene, does not represent an essential complement but interpolymers formed with a polyene, present as a fourth monomer, can be used in the practice of this invention and is intended to be included.

The polyene or other ethylenically unsaturated compound containing a plurality of carbon-to-carbon double bonds may be an open chain polyunsaturated hydrocarbon containing 4 to 20 carbon atoms, such as 1,4-hexadiene, monocyclic polyenes and polycyclic polyenes, but it is preferred to make use of a polyunsaturated bridged ring hydrocarbon, such as the polyunsaturated derivatives of bicyclo (2,2,1) heptane wherein at least one of the double bonds is present in one of the bridged rings, such as dicyclopentadiene, bicyclo (2,2,1)hepta-2,5-diene, or alkylidene norbornenes and preferably a 5-alkylidene-2-norbornene wherein the alkylidene group contains from one to 20 carbon atoms and preferably one to eight carbon atoms, or the alkenyl norbornenes, and preferably the 5-alkenyl-2-norbornenes wherein the alkenyl group contains from three to 20 carbon atoms and preferably from three to 10 carbon atoms. Other bridged ring hydrocarbons include polyunsaturated derivatives of bicyclo (2,2,2) octane, as represented by bicyclo (2,2,2) octa-2,5-diene, polyunsaturated derivatives of bicyclo (3,2,1) octane, polyunsaturated derivatives of bicyclo (3,3,1) nonane. At least one double bond is present in the bridged ring of the above compounds and at least one other double bond is present in a bridged ring or in a side chain. Specific examples of preferred bridged ring compounds of the type described above include 5-methylene-2-norbornene, 5-ethylidene-2-norbornene, 5-n-propylidene-2-norbornene, 6-isopropylidene-2-norbornene, 5-n-butylidene-2-norbornene, 6-isobutylidene-2-norbornene, 5-(2-methyl-2-butenyl)-2-norbornene, 5-(3-methyl-2-butenyl)-2-norbornene and 5-(3-dimethyl-4-hexenyl)-2-norbornene. The interpolymer prepared from 5-ethylidene-2-norbornene is greatly preferred since the combination which makes use thereof has outstanding properties and it appears to be somewhat unique by reference to the others.

The fourth monomeric component, the polyene or substituted polyene, may be chemically bound in the interpolymer in an amount within the range of 0.1 to 10 mole percent, and preferably 0.1 to 3 mole percent, or in an amount to provide an actual or calculated unsaturation level of at least two double bonds per 1,000 carbon atoms of the interpolymer chain. However, amounts to provide much higher unsaturation levels are preferred, such as levels of up to 100 double bonds per 1,000 carbon atoms in the interpolymer, and preferably an amount to provide from 2.5 to 30 double bonds per 1,000 carbon atoms, and more preferably 2.5 to 15 double bonds per 1,000 carbon atoms. The specific unsaturation level selected to be introduced by the polyene component will vary depending upon the properties desired in the elastomeric interpolymer that is formed.

The unsaturated organo silane, or second monomer, is employed in the reaction mixture in an amount within the range of more than 0.1 percent but less than 10 percent by weight and preferably in an amount within the range of 1.0 to 5.0 percent by weight of the total monomer system.

Since the allyl and vinyl and the like unsaturated aliphatic halo silanes are slow in the polymerization reaction by comparison with the norbornenyl silanes and are less competitive from the standpoint of reactivity by comparison with the other monomeric components, more of the aliphatic unsaturated silane is used, but only a fraction, such as one-hundredth to one-tenth of the monomer, it is believed, enters into the polymer backbone. On the other hand, the norbornenyl or substituted norbornenyl silanes are sufficiently reactive to compete more favorably with the other monomer components and therefore are preferred for use as the second monomer.

As the second monomer, it is undesirable to make use of an unsaturated silane in which the highly hydrolyzable groups are in the form of an alkoxy or primary or secondary amino groups, such as methoxy or ethoxy or NHR groups, since such oxygen and nitrogen containing groups tend to poison the polymerization catalyst and thus destroy the reactivity necessary for interpolymerization of the monomers. When use is made of unsaturated silanes having highly hydrolyzabl halogen or tertiary amino groups as the hydrolyzable groups on the unsaturated silane, such groups can be retained by the second monomer during interpolymerization with the other monomers to become a part of the backbone of the interpolymer.

The interpolymerization of the monomeric components described can be carried out in solution in an inert organic solvent, in the presence of a Ziegler type catalyst, all of which will hereinafter be described.

In the interpolymer of the invention, it is preferred to make use of the first monomer ethylene and the third monomeric component propylene or other $C_3$ to $C_{20}$ monoolefin for copolymerization in the interpolymer in the ratio of 20-95 moles of ethylene to 80-5 moles of the third monomeric component and preferably within the range of 45-90 moles of ethylene to 55-10 moles of propylene, or other third monomeric component.

The polymerization solvent may be any suitable inert organic solvent which is liquid under the reaction conditions such as any prior art solvent useful for solution polymerization of monoolefins in the presence of Ziegler type catalysts. Examples of satisfactory hydrocarbon solvents include acyclic paraffins and olefins containing three to eight carbon atoms, and preferably hexane; aromatic hydrocarbons and preferably aromatic hydrocarbons containing a single benzene nucleus such as benzene, toluene and the like; cyclic hydrocarbons which have a boiling point range approximately that for the straight chain paraffin hydrocarbon and aromatic hydrocarbons discussed above, and preferably cyclic hydrocarbons containing five or six ring carbon atoms; chlorinated hydrocarbons such as carbon tetrachloride, chlorobenzene and tetrachloroethylene. The solvent may be a mixture of one or more of the foregoing hydrocarbons, such as a mixture of aliphatic and naphthenic hydrocarbons, preferably having approximately the same boiling range as normal hexane. It is important for the solvent to be dry and free of substances which will interfere with the Ziegler catalyst to be used in the polymerization process.

Ziegler catalysts, as described in the prior art, may be employed. Such Ziegler catalysts are disclosed in a large number of patents, such as U.S. Pat. Nos. 2,933,480, 3,093,620, 3,211,709 and 2,113,115. Such Ziegler catalysts generally include metal organic coordination catalysts prepared by contacting a compound of a heavy metal of the groups IV-b to VII-b of the Mendelejeff periodic system of elements, such as titanium, vanadium and chromium halides with an organometallic compound of a metal of Groups I to III of the Mendelejeff periodic system which contains at least one carbon-metal bond, such as trialkyl aluminum and alkyl aluminum halides wherein the alkyl groups contain from one to 20 and preferably one to four carbon atoms.

The preferred Ziegler catalyst for the described polymerization is prepared from a vanadium compound and alkyl aluminum halide such as vanadium trichloride, vanadium tetrachloride, vanadium oxychloride, vanadium acetylacetonate, etc., and alkyl aluminum chloride activators having the general formula $R_1AlCl_2$ and $R_2AlCl$, and the corresponding sesqui-chlorides having the general formula $R_3Al_2Cl_3$ in which R is methyl, ethyl, propyl, butyl, or isobutyl. In the catalytic system, the aluminum to vanadium mole ratio of the aluminum and vanadium compounds may be within the range of 5-200:1 and preferably within the range of 15-60:1. A catalyst prepared of alkyl aluminum sesquichloride, such as methyl or ethyl aluminum sesquichloride, and vanadium oxychloride is preferred, with the preferred ratio of 1 mole vanadium oxychloride for 5-200 moles of aluminum and preferably for each 15-60 moles of aluminum.

Generally the polymerization reaction may be carried out in a temperature range of −40° to 150° C. and preferably within a temperature range of 0° to 60° C. during the course of the reaction. The polymerization reaction may be carried out at substantially atmospheric pressure but pressures up to 1,000 psi may be employed.

The polymerization is preferably carried out on a continuous basis in a dry reaction vessel which is closed to the outside atmosphere and which is provided with means for agitation, reactor cooling means, and inlets and outlets for continuously supplying the ingredients of the reaction mixture including the monomer and catalyst, and for continuous withdrawing of the elastomer solution. The polymerization is carried out in a liquid phase in the organic solvent in the presence of the Ziegler catalyst and the solution of elastomer in the polymerization solvent is withdrawn continuously from the reaction vessel and the cement is then treated with the desired chemical hereinafter described which will react with the hydrolyzable Si-X function to form the uniquely substituted α-olefin interpolymer.

An important concept of this invention resides in the compounding of interpolymers of the type described to produce compositions characterized by controlled cure or vulcanization at room temperature and which exhibit good adhesion to various surfaces, including metals, minerals, plastics and glass. When, as in the preferred practice of this invention, the formed polymer is of low molecular weight to enable fluid or plastic flow, the compositions of this invention find beneficial use as caulks, sealants, potting compounds, encapsulating compositions and for flexible mold making, or as a composition that can be molded to various shapes for subsequent cure or vulcanization.

For this purpose, it is desirable to form the interpolymer with highly hydrolyzable groups attached to the silicon atom of the organosilicon component bound into the interpolymer and to convert such highly hydrolyzable group to alkoxy in a post reaction with methanol, ethanol or the like lower alcohols. For conversion to the corresponding alkoxy groups such as methoxy, ethoxy and the like groups attached to the silicon atom.

Such substituted alkoxy groups are not as readily hydrolyzable in water or other active hydrogen containing materials but as a result, the interpolymer can be compounded with other materials without cross-linking or premature cure or vulcanization. With the alkoxy function substituted for the hydrolyzable halogen or amino groups originally present in the silane monomer, cure of the interpolymer can be controlled with an organotin carboxylate in a manner to provide stability during compounding and storage of the formed composition, while permitting cure or vulcanization at room temperature when exposed to atmospheric conditions.

Representative of the organotin carboxylates that can be used in the practice of this invention are dibutyl tin diacetate, dibutyl tin dilaurate, dibutyl tin caproate, stannousoctoate and other lower $C_1$ to $C_5$ dialkyl tin aliphatic acid salts. The desired results can be secured when the curing agent is present in the composition in an amount within the range of 2 to 10 parts by weight and preferably 2 to 5 parts by weight per 100 parts by weight of the interpolymer.

Room temperature vulcanization or cure can be accelerated, without material reduction in shelf life, when use is made of an organic amine as an ingredient present in the composition in addition to the curing agent. Organic amines are not normally employed in organosilicon polymers, nevertheless, the desired acceleration of cure or vulcanization can be achieved with such amines as represented by aliphatic amines, and preferably secondary amines such as morpholine.

The desired acceleration of cure, without undesirable effect on shelf life, can be obtained by formulation of the composition to include 1 to 10 parts by weight and preferably 2 to 5 parts by weight of the amine accelerator per 100 parts by weight of interpolymer in the composition. The amine accelerator appears to provide a synergistic reaction in the presence of the tin alkylate thereby to enable reduction in the amount of curing agent by up to 50 percent of the amount otherwise required to achieve a corresponding cure rate.

The compositions of this invention can be further modified to improve adhesion to surfaces otherwise difficult to bond by the addition of a component referred to herein as an adhesion promoter. In the system described, the desired improvement in adhesion is achieved by the addition of an aminosilane, its hydrolysis product, or its polymerization product, in which the aminosilane is an organosilane having from 1 to 3 highly hydrolyzable groups attached to the silicon atom, with the remaining valences of the silicon atom taken up by hydrogen or an organic group of the type previously described for the monomer, but in which at least one of the groups attached to the silicon atom is an aminoalkyl. Representative of such aminosilanes are gammaaminopropyltriethoxy silane, aminopropyltrimethoxy silane, preferably N-(2-aminoethyl)-3-aminopropyltrimethoxysilane. Improvement in adhesion is obtained when the aminosilane is present in an amount up to 10 parts by weight and preferably in an amount within the range of 2 to 5 parts by weight per 100 parts by weight of interpolymer.

Further modification to improve surface finish and functional stabilization of the compositions of this invention can be achieved by formulation of the composition to include an aliphatic alcohol, diol or polyol containing 2 or more carbon atoms, and preferably a $C_2$ to $C_{12}$ alcohol such as ethanol, propanol, butanol, hexanol, glycol, ethylene glycol, propylene glycol, glycerol and the like. The alcohol is effective in the composition to enhance the smoothness and appearance of the surface whereby a glossy finish is obtained and it is effective also to enhance the stability of the composition to enable storage over a longer period of time, when stored in the absence of moisture. Beneficial results of the type described are experienced when the composition is formulated to contain 1 to 10 and preferably 2 to 5 parts by weight alcohol per 100 parts by weight of interpolymer.

Having described the basic concepts of the invention, illustrations will now be made, by way of examples, which are given by way of illustration and not by way of limitation of the invention.

EXAMPLE 1

This example describes the preparation of an interpolymer of ethylene, propylene and 7-isopropylidenyl-5-trichlorosilyl-2-norbornene.

The reaction vessel was a one-gallon Sutherland reactor equipped with a high speed, heavy duty, air driven motor, cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 10% of the gaseous monomer feed to prevent inert gas buildup.

The clean reactor was assembled, rinsed with dry hexane, and purged overnight with dry nitrogen. In the morning, the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 45° C., propylene was fed to the reactor through a 4A molecular sieve column until 16 psig pressure was reached. The pressure was then brought up to 20 psig with ethylene fed through a 4A molecular sieve column and brought up to 31 psig with dry hydrogen; 60 μl of pyridine, 0.56 cc (2.52 mM) of 7-isopropylidenyl-5-trichlorosilyl-2-norbornene, and 2.6 cc of 1.5 M ethylaluminum sesquichloride were added.

The monomers were shut off and the catalyst (1.0 molar ethylaluminum sesquichloride and 0.03 molar vanadium oxytrichloride at a 40 to 1 aluminum to vanadium ratio, and 0.21 molar butyl perchlorocrotonate at a ratio of 7 to 1 perchlorocrotonate to vanadium ratio) were fed into the reactor at a constant rate until a drop in pressure in the reactor was noted. At this time, the gaseous monomers were fed into the reactor through suitably calibrated rotometers at a rate of 3450 cc per minute, of which 165 cc were hydrogen, 1260 cc were ethylene, and 2025 cc were propylene; the 7-isopropylidenyl-5-trichlorosilyl-2-norbornene was added as a 0.248 M solution in hexane at 3.70 cc/minute which provide about 5.75 weight percent to be incorporated into the polymer. Pyridine was added as a solution so that approximately 1 millimole/liter of hexane was always present in the reaction. The polymerization was controlled by the catalyst pumps which added catalyst on demand as the pressure increased, thus maintaining the 31 psig throughout the run. When the solution became approximately 8% polymer, solvent containing 16 cc/cc ethylene was fed at the rate of 60 cc per minute into the reactor and the polymer cement taken off, which produced about 241 g of polymer per hour.

At this time, the ethylene and propylene feeds were adjusted to 279 cc/minute and 3294 cc/minute to compensate for the unreacted monomers removed with the cement; the hydrogen feed remained unchanged.

The polymer cement as removed from the reactor was passed into a second stirred gallon Sutherland reactor so that for each liter of cement, 200 ml of methanol was present. After a resonance period of 20 minutes, the cement was twice washed with methanol and the excess methanol decanted. The cement was placed in a rotary evaporator and Irganox 1010 antioxidant added as a solution in toluene so that 0.1 wt. % antioxidant would remain in the polymer after solvent removal. The flask was heated to 100° C. and rotated while a vacuum was applied; the vacuum removed the hexane from the cement. The evaporation was continued for an additional 30 minutes after all bubble formation had ceased. The polymer was recovered as a honey colored liquid which was quite fluid at elevated temperatures.

Analysis showed that it contained 5 wt. % 7-isopropylidenyl-5-trichlorosilyl-2-norbornene which had been converted to the methoxy derivative. The bulk viscosity of the product measured by a Brookfield viscometer was 15,000 poise at 23.5° C. and had a reduced specific viscosity of 0.30.

EXAMPLE 2

This example describes the preparation of an interpolymer, similar to that of Example 1, but in which the organosilicon monomer is 5-trichlorosilyl-2-norbornene instead of 7-isopropylidenyl.

The reaction vessel and conditions are identical with those in Example 1 except that 1.6 cc (8.9 mM) of 5-trichlorosilyl-2-norbornene was initially added to the reactor rather than the 0.56 cc (2.52 mM) 7-isopropylidenyl-5-trichlorosilyl-2-norbornene. During the polymerization, a 0.912 molar solution of 5-trichlorosilyl-2-norbornene was added in place of the 0.248 molar 7-isopropylidenyl-5-trichlorosilyl-2-norbornene. The shortstopping with methanol and work up of the final polymer were identical.

Analysis showed that the polymer contained 6.7 weight % active 5-methoxysilyl-2-norbornene. The bulk viscosity of the polymer was 13,200 poise at 23.5° C. and had a reduced specific viscosity of 0.39.

EXAMPLE 3

This example corresponds to Example 1, but in which the preparation of the interpolymer is carried out on a pilot plant scale.

The reaction was carried out in a 20 gallon continuous flow stirred tank reactor. Commercial grade hexane was used as the solvent. Solvent feed rate was 76 lbs/hr and the level in the reactor was controlled to give a residence time of about 35 minutes. Polymerization grade ethylene was added at 4.5 lb/hr and polymerization grade propylene was added at 11.2 lb/hr. Third monomer 7-isopropylidenyl-5-trichlorosilyl-2-norbornene was added as a 0.54 M solution in hexane at a rate of 2100 ml/hr which provided about 7.8 weight percent to be incorporated into the polymer. Catalyst vanadium oxytrichloride (VOCl$_3$) was fed as a 0.023 M solution in hexane at a rate of 388 ml/hr. Co-catalyst, diethylaluminum chloride (DEAC), was fed as a 1.2 M solution in hexane at a rate of 321 ml/hr. The molar ratio of aluminum to vanadium was 41 to 1. Activator, n-butyl perchlorocrotonate (BPCC), was fed as a 0.21 M solution in hexane at a rate of 312 ml/hr. The molar ratio of BPCC to vanadium was 7.6 to 1. Inhibitor, pyridine, was added as a 0.78 M solution in hexane at a rate of 225 ml/hr. Sufficient hydrogen was added to maintain 42 mole percent hydrogen in the reactor vapor space. At a reactor temperature of 113° F. and reactor pressure of 54.7 psig, 8.6 lb/hr of polymer were produced which had an ethylene to propylene molar ratio of 48 to 52.

Following the reactor, the polymer cement was shortstopped with technical grade methanol which was added at three gallons per hour to the cement stream. Methanol serves to remove catalyst residue and to methoxylate the trichloro group of the third monomer, 7-isopropylidenyl-5-trichlorosilyl-2-norbornene. Additionally, 138 ml/hr of a 5.5 wt. % solution of Irganox 1010 antioxidant in toluene were added to the cement stream at this point so that the neat polymer would contain 0.18 wt. % antioxidant. The mixture of polymer cement and methanol were contacted in an agitated vessel with a 15 minute residence time operating at about 100° F. and 65 psia. The mixture was then decanted in a vessel with a 60 minute residence time operating at 100° F. and 63 psia to separate a methanol-rich phase and a polymer cement phase. The polymer cement exiting the decantation vessel was again contacted with three gallons per hour of technical grade methanol and the mixture was introduced into a second agitated vessel which was identical to the first in mechanical design and operating conditions. The mixture was then decanted in a vessel having a residence time of 40 minutes and operating at 100° F. and 63 psia.

The decanted polymer cement was stripped of unreacted monomers, solvent and residual methanol in a wiped film evaporator. Recovery temperature ranged from 210° F. to 225° F. at an absolute pressure of 23 mm Hg. Residual hexane in the product, which was a honey colored liquid at room temperature, was less than 1.0%. Bulk viscosity of the product was 563,000 centipoise at 77° F. as measured with a Brookfield viscometer. Analysis showed that the polymer contained 6.8 wt. % active 7-isopropylidenyl-5-trimethoxysilyl-2-norbornene.

EXAMPLE 4

This example describes the preparation of an interpolymer of ethylene, propylene, 5-ethylidene-2-norbornene (a polyene) and 7-isopropylidenyl-5-trichlorosilyl-2-norbornene.

The reaction vessel was a one-gallon Sutherland reactor equipped with a high speed, heavy duty, air driven motor, cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 10% of the gaseous monomer feed to prevent inert gas buildup.

The clean reactor was assembled, rinsed with dry hexane, and purged overnight with dry nitrogen. In the morning, the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 45° C., propylene was fed to the reactor through a 4A molecular sieve column until 16 psig pressure was reached. The pressure was then brought up to 20 psig with ethylene fed through a 4A molecular sieve column and brought up to 31 psig with dry hydrogen; 60 μl of pyridine, 0.18 cc (1.36 mM) of 5-ethylidene-2-norbornene, 0.56 cc (2.52 mM) of 7-isopropylidenyl-5-trichlorosilyl-2-norbornene, and a 2.6 cc of 1.5 M ethylaluminum sesquichloride was added.

The monomers were shut off and the catalysts (1.0 molar ethylaluminum sesquichloride and 0.03 molar vanadium oxytrichloride at a 40 to 1 aluminum to vanadium ratio, and 0.21 molar butyl perchlorocrotonate at a ratio of 7 to 1 perchlorocrotonate to vanadium ratio) were fed into the reactor at a constant rate until a drop in pressure in the reactor was noted. At this time, the gaseous monomers were fed into the reactor through suitably calibrated rotometers at a rate of 3450 cc per minute, of which 165 cc were hydrogen, 1260 cc were ethylene, and 2025 cc were propylene; the ethylidene norbornene was added as a 0.162 L M solution in hexane at 3.75 cc/min. which provided about 2 C═C per 1000 C of unsaturation to the polymer; the 7-isopropylidenyl-5-trichlorosilyl-2-norbornene was added as a 0.248 M solution in hexane at 3.70 cc/minute which provided about 5.75 weight percent to be incorporated into the polymer. Pyridine was added as a solution in the ethylidene norbornene solution so that approximately 1 millimole/liter of pyridine was always present in the reaction. The polymerization was controlled by the catalyst pumps which added catalyst on demand as the pressure increased, thus maintaining the 31 psig throughout the run. When the solution became approximately 8% polymer, solvent containing 16 cc/cc ethylene was fed at a rate of 60 cc per minute into the reactor and the polymer cement taken off which produced about 241 g of polymer per hour.

At this time, the ethylene and propylene feeds were adjusted to 279 cc/minute and 3294 cc/minute to compensate for the unreacted monomers removed with the cement; the hydrogen feed remained unchanged.

The polymer cement, as removed from the reactor, was passed into a second stirred gallon Sutherland reactor so that for each liter of cement, 200 ml of methanol was present. After a residence period of 20 minutes, the cement was twice washed with methanol and the excess methanol decanted. The cement was placed in a rotary evaporator and antioxidant (Irganox 1010) added as a solution in toluene so that 0.1 weight % antioxidant would remain in the polymer after solvent removal. The flask was heated to 100° C. and rotated while a vacuum was applied; the vacuum removed the hexane from the cement. The evaporation was continued for an additional 30 minutes after all bubble formation had ceased. The polymer was recovered as a honey colored liquid which was quite fluid at elevated temperatures.

Analysis showed that it contained 5 weight % 7-isopropylidenyl-5-trichlorosilyl-2-norbornene which had been converted to methoxy derivative and two carbon to carbon double bonds per 1000 carbon atoms (2.0 C═C/1000 C) unsaturation due to the ethylidene norbornene. The bulk viscosity of the product measured by a Brookfield viscometer was 15,000 poise at 23.5° C. and had a reduced specific viscosity of 0.30.

The following are examples of compositions of this invention compounded with the interpolymers of Examples 1 to 4, in which the ingredients are given in parts by weight.

EXAMPLE 5

Ingredients

100 Interpolymer of Example 2.
20 Fumed silica (Cab-O-Sil MS5)
5 Titanium dioxide
5 Zinc oxide
5 Dibutyl tin diacetate Except for the dibutyl tin diacetate, the ingredients were mixed in a Brabender Plasti-Corder and then the mixing was continued for an additional three minutes after the dibutyl tin diacetate was added to provide a smooth paste.

The resultant mixture becomes tack free in 24 hours in the atmosphere and cures to an elastomer in three to seven days upon exposure to atmospheric conditions. The cured elastomer has the following properties:

Tensile strength in psi: 268
Elongation in percent: 120
Hardness (Shore A): 40

EXAMPLE 6

Ingredients

100 Interpolymer of Example 1
20 Fumed silica
5 Titanium dioxide
5 Zinc oxide
5 Dibutyl tin dilaurate The compounding of the ingredients was the same as in Example 5.

The compound became tack free in about 6 hours and cured to an elastomer in about one week when exposed to atmospheric conditions.

The cured properties of the elastomer were as follows:

Tensile strength in psi: 200
Elongation in percent: 135
Tear (Die C) in ppi: 25
Hardness (Shore A): 32

EXAMPLE 7

Ingredients 100 interpolymer of Example 2
40 silane treated Kaolin (Translink 37-Freeport)
5 Titanium dioxide
5 Zinc oxide
2 Morpholine
10 Toluene
10 Dibutyl tin diacetate The ingredients were mixed in a moisture-free environment to form a pourable paste and then packaged in a sealed collapsible tube for use as a caulk.

The paste, when squeezed out of the tube, became tack free in 2 to 4 hours and cured through a thickness of ¼ inch in four to five days in atmospheric conditions. The packaged paste remained squeezable for over one month.

EXAMPLE 8

This example is the same as Example 7 but with the amine accelerator (morpholine) deleted.

The resulting compound did not become tack free before 18 hours and it took 14 days to cure through ¼ inch, when exposed to atmospheric conditions.

EXAMPLE 9

Ingredients

100 Interpolymer of Example 3
120 Silane treated kaolin
5 Titanium dioxide
5 Zinc oxide
20 Xylene
3.3 Morpholine
5 N-(2-aminoethyl)-3-aminopropyl trimethoxy silane
3.3 Dibutyl tin diacetate The ingredients were mixed in a moisture-free environment to form a plaste.

The paste has a tack free time of ½ hour. It cured through ¼ inch in two days and gave a cohesive failure of 8 to 10 ppi when peeled from roll finished aluminum, stainless steel or plate glass surface.

EXAMPLE 10

This example is the same as Example 9 except that the adhesion promoter N-(2-aminoethyl)-3-aminopropyl trimethoxy silane was deleted.

The resulting paste, cured as in Example 9, has a peel strength less than 1 ppi.

EXAMPLE 11

Ingredients

100 Interpolymer of Example 3
120 Silane treated kaolin
5 Titanium dioxide
5 Zinc oxide
20 Xylene
3 Morpholine
5 Alpha-aminopropyl trimethoxy silane
5 Hexyl alcohol
3 Dibutyl tin diacetate The ingredients were mixed in a moisture-free environment.

The resulting compound had a tack free time of ½ hour. It cured through ¼ inch in three days and had a glossy surface. The compound had excellent shelf life when packaged in a sealed tube.

EXAMPLE 12

This example is the same as Example 11 except that the surface improver and stabilizer (hexyl alcohol) was deleted. The resulting compound had a tack free time of ½ to 1 hour and good adhesion. However, the surface of the product cured by exposure to atmospheric conditions was not glossy and the compound tended slowly to harden after one month storage at room temperature in a sealed package.

EXAMPLE 13

Example 11 can be further modified by the addition of a processing oil such as Circosol 4240, in amounts up to 50 parts by weight and preferably in an amount within the range of 10 to 20 parts by weight per 100 parts by weight of interpolymer further to improve the processing characteristics as well as the flexibility of the cured compound.

The cured compounds of this invention are characterized by practically 100 percent recovery and slow cure upon exposure to moisture or moisture conditions such as in the atmosphere, thereby to enable slow cure at room temperature.

While the presence of the alkoxy groups on the organosilicon component bound into the interpolymer are preferred for controlling cure in the presence of such agents as the tin alkylates, use can be made of interpolymers in which the highly hydrolyzable halogen groups are only partially replaced with alkoxy groups.

It is understood that changes may be made in the details of the formulation and operation, without departing from the spirit of the invention, especially as defined in the following claims.

I claim:

1. A composition having controlled room temperature cure containing an interpolymer selected from the group consisting of an EPM interpolymer formed by copolymerization in the presence of a Ziegler catalyst of ethylene, a monoolefin containing 3 to 12 carbon atoms, and an unsaturated organo-silane having at least one unsaturated organic group and from 1 to 3 highly hydrolyzable groups other than oxygen containing groups thereby to avoid poisoning the catalyst and maintaining the stability of the polymerization reaction attached to the silicon atom and an EPDM interpolymer of ethylene, a monolefin containing 3 to 12 carbon atoms, a polyene and an unsaturated organosilane of the type described with hydrolyzable groups remaining on the organosilanes bound in the interpolymer replacing the hydrolyzable groups with short chained alkoxy groups at a time when they can no longer interfere with the polymerization reaction, and an organotin carboxylate for controlling room temperature cure of the interpolymer containing the short chained alkoxy groups.

2. A composition as claimed in claim 1 in which the organotin carboxylate is present in an amount within the range of 2 to 10 parts by weight per 100 parts by weight of the interpolymer.

3. A composition as claimed in claim 1 in which the organotin carboxylate is present in an amount within the range of 2 to 5 parts by weight per 100 parts by weight of the interpolymer.

4. A composition as claimed in claim 1 in which the organotin carboxylate is a $C_1$ to $C_5$ dialkyl tin aliphatic acid ester.

5. A composition as claimed in claim 1 in which the organotin carboxylate is selected from the group consisting of dibutyl tin diacetate, dibutyl tin dilaurate, dibutyl tin caproate, and stannous octoate.

6. A composition as claimed in claim 1 which includes an accelerator in the form of an organic amine.

7. A composition as claimed in claim 6 in which the organic amine is an aliphatic amine.

8. A composition as claimed in claim 6 in which the organic amine is a secondary amine.

9. A composition as claimed in claim 6 in which the organic amine is morpholine.

10. A composition as claimed in claim 6 in which the organic amine is present in an amount within the range of 1 to 10 parts by weight per 100 parts by weight of interpolymer.

11. A composition as claimed in claim 6 in which the organic amine is present in an amount within the range of 2 to 5 parts by weight per 100 parts by weight of interpolymer.

12. A composition as claimed in claim 1 which includes an organic alcohol selected from the group consisting of an aliphatic alcohol, diol and polyol having at least two carbon atoms.

13. A composition as claimed in claim 12 in which the organic alcohol has from 2 to 12 carbon atoms.

14. A composition as claimed in claim 12 in which the organic alcohol is present in an amount within the range of 1 to 20 parts by weight per 100 parts by weight of interpolymer.

15. A composition as claimed in claim 12 in which the organic alcohol is present in an amount within the range of 2 to 5 parts by weight per 100 parts by weight of interpolymer.

16. A composition as claimed in claim 1 which includes an accelerator in the form of an organic amine, and an organic alcohol selected from the group consisting of an aliphatic monoalcohol, diol and polyol having at least 2 carbon atoms.

17. A composition as claimed in claim 1 which includes fillers.

18. A composition as claimed in claim 6 which includes fillers.

19. A composition as claimed in claim 12 which includes fillers.

* * * * *